United States Patent [19]

Woffinden

[11] Patent Number: 4,654,790

[45] Date of Patent: Mar. 31, 1987

[54] TRANSLATION OF VIRTUAL AND REAL ADDRESSES TO SYSTEM ADDRESSES

[75] Inventor: Gary A. Woffinden, Scotts Valley, Calif.

[73] Assignee: Amdahl Corporation, Sunnyvale, Calif.

[21] Appl. No.: 555,901

[22] Filed: Nov. 28, 1983

[51] Int. Cl.⁴ ............................................. G06F 12/10
[52] U.S. Cl. ................................................... 364/200
[58] Field of Search ....... 364/200 MS FILE, 900 MS FILE

[56] References Cited

U.S. PATENT DOCUMENTS

| | | | |
|---|---|---|---|
| 3,723,976 | 3/1973 | Alvarez et al. | 364/200 |
| 3,800,291 | 3/1974 | Cocke et al. | 364/200 |
| 4,218,743 | 8/1980 | Hoffman et al. | 364/200 |
| 4,453,210 | 6/1984 | Suzuki et al. | 364/200 |
| 4,455,602 | 6/1984 | Baxter, III et al. | 364/200 |
| 4,466,056 | 8/1984 | Tanahashi | 364/200 |
| 4,482,952 | 11/1984 | Akagi | 364/200 |
| 4,513,369 | 4/1985 | Sato et al. | 364/200 |
| 4,519,032 | 5/1985 | Mendell | 364/200 |
| 4,519,036 | 5/1985 | Green | 364/200 |
| 4,525,778 | 6/1985 | Cane | 364/200 |
| 4,551,797 | 11/1985 | Amdahl et al. | 364/200 |
| 4,587,610 | 5/1986 | Rodman et al. | 364/200 |
| 4,612,612 | 9/1986 | Woffinden et al. | 364/200 |

Primary Examiner—Archie E. Williams, Jr.
Attorney, Agent, or Firm—Fliesler, Dubb, Meyer & Lovejoy

[57] ABSTRACT

An apparatus translates a set of logical addresses to a system addresses where the set of logical addresses includes virtual and real addresses which map to the same system address. An address mechanism provides a requesting field for indicating when a requesting logical address is virtual or when a requesting logical address is real. An address translator translates logical addresses to system addresses. A translation buffer stores translation information for associating logical addresses with system addresses. The translation buffer includes means for storing a resident field for indicating if stored translation information associates a virtual address with a system address, a real address with a system address, or both a real address and a virtual address with a system address.

9 Claims, 2 Drawing Figures

FIG.—1

TRANSLATION OF VIRTUAL AND REAL ADDRESSES TO SYSTEM ADDRESSES

CROSS-REFERENCES

DATA SELECT MATCH, Ser. No. 527,674, Filed: Aug. 29, 1983.

TRANSLATION LOOKASIDE BUFFER POINTER, Ser. No. 528,094, Filed: Aug. 29, 1983.

APPARATUS FOR REVERSE TRANSLATION, Ser. No. 528,091, Filed: Aug. 29, 1983, now U.S. Pat. No. 4,551,797.

TIME SHARED TRANSLATION BUFFER, U.S. Pat. No. 4,551,979, Ser. No. 814,004, Filed: Dec. 19, 1985, a continuation of Ser. No. 530,768, Field: Sept. 7, 1983, now abandoned.

VIRTUALLY ADDRESSED CACHE, Ser. No. 527,678, Filed: Aug. 29, 1983, now U.S. Pat. No. 4,612,612.

EVICTION CONTROL APPARATUS, Ser. No. 789,035, Filed: Oct. 17, 1985, a continuation of Ser. No. 527,676, Filed: Aug. 29, 1983 now abandoned.

MEMORY SYSTEM, Ser. No. 528,093, Filed: Aug. 29, 1983 now abandoned.

BACKGROUND OF THE INVENTION

The present invention relates to the field of instruction controlled digital computers and specifically to methods and apparatus associated with virtual and real addressing in data processing systems.

It is common in data processing systems to have a memory hierarchy wherein buffer memories of relatively low capacity, but of relatively high speed, operate in cooperation with main memories of relatively high capacity but of relatively low speed. It is desired that the vast majority of accesses, either to fetch or store information, be from the buffer memory so that the overall access time of the system is enhanced. In order to have the vast majority of accesses come from the relatively fast buffer memory, information is exchanged between the main memory and the buffer memory in accordance with predetermined algorithms.

The efficiency with which a buffer memory works in decreasing the access time of the overall system is dependent on a number of variables. For example, the variables include the capacity of the buffer memory, the capacity of the main store, the data transfer rate between stores, the replacement algorithms which determine when transfers between the main store and buffer are made, and the virtual-to-real address translation methods and apparatus.

In recent data processing systems, the addressing of storage units has been carried out using logical addresses. Logical addresses are typically defined to be either virtual addresses or real addresses. Both the real addresses and the virtual addresses must be transformed in order to actually address a physical address location in memory. The physical address location in memory is frequently called a system address. However, even system addresses may require one or more transforms to arrive at final physical addresses. Therefore, before a system address location can be accessed using a logical address, the logical address must be transformed to the system address. If the logical address is a virtual address, then the transform is a virtual-to-system transform. If the logical address is a real address, then the transform is a real-to-system transform. In some systems, a virtual-to-system transform can be implemented in steps with a virtual-to-real transform followed by a real-to-system transform. In some systems, real addresses are equivalent to system addresses, making the real-to-system transform trivial.

The transforms employed for real addresses are typically less complex than the transforms for virtual addresses. Usually, the real-to-system transforms include prefixing and/or base adjustment. The virtual-to-system address transforms however, generally employs a table in mainstore which specifies the transform.

Each virtual address space typically has a virtual address space descriptor which identifies the transform tables which are to be utilized in transforming the virtual address to a system address.

The transformation process for transforming logical addresses to system addresses is time consuming process, particularly for virtual addresses which typically have translation tables stored in main store.

In order to speed up the translation process, translation lookaside buffers have been employed. In such translation buffers, the translation information resulting from a translation of a logical address to a system address are saved once the translation has been made. When an access to the same location is desired and the translation information is already stored in the translation buffer, time is saved since the re-translation from the logical address to the system address is not required to be made.

In many data processing systems, for a significant portion of the address space, the virtual-to-system transform and the real-to-system transform are identical, that is, numerically equivalent virtual and real addresses are transformed to the same system address.

In prior art systems, in spite of this identity, both virtual-to-system and real-to-system transforms have been carried out and independently placed in the translation lookaside buffer. This process of storing both transforms in the TLB is wasteful of system resources.

In view of the background, there is a need to be less wasteful of system resources and to provide mechanisms which take advantage of the identity of the transforms.

In view of the above background, there is a need for new and improved mechanisms which are particularly useful in systems using virtual addressing.

SUMMARY OF THE INVENTION

The present invention is a memory apparatus in which virtual and real addresses which map to the same system addresses are identified in order to reduce overhead. Overhead is reduced since the system addresses are accessed by both virtual and real addresses without need for duplicative translation buffer entries.

The system includes a main store that stores data at system addresses and a buffer store that stores a subset of the data from the main store. An address mechanism addresses the buffer store with logical addresses. The address mechanism provides a requesting field for indicating when a requesting logical address is virtual or when a requesting logical address is real. An address translator translates logical addresses to system addresses. A translation buffer stores translation information for associating logical addresses with system addresses. The translation buffer includes means for storing a resident field for indicating if stored translation information relates to virtual-to-system translations and/or to real-to-system translations.

A comparator compares the requesting field of a requesting logical address and the resident field in the translation buffer to determine if the translation buffer stores translation information for the requesting logical address.

A control mechanism sets the resident field to indicate when translation information stored in the translation buffer is for virtual-to-system and/or real-to-system translations.

Whenever the comparator determines that the translation information for the requesting logical address is in the translation buffer, the system address corresponding to the requesting logical address is obtained directly without need for further translations.

Whenever the requesting logical address is for information that is addressable by either virtual or real addresses, the resident field in the translation buffer is marked to indicate that the virtual space and real space are equal and that the translation information is valid for both spaces.

In accordance with the above summary, the present invention achieves the objective of providing an improved virtual storage and multi-programming data processing system.

Additional objects and features of the invention will appear from the following description in which the preferred embodiments of the invention have been set forth in detail in conjunction with the drawings.

DETAILED DESCRIPTION

Figure 1:
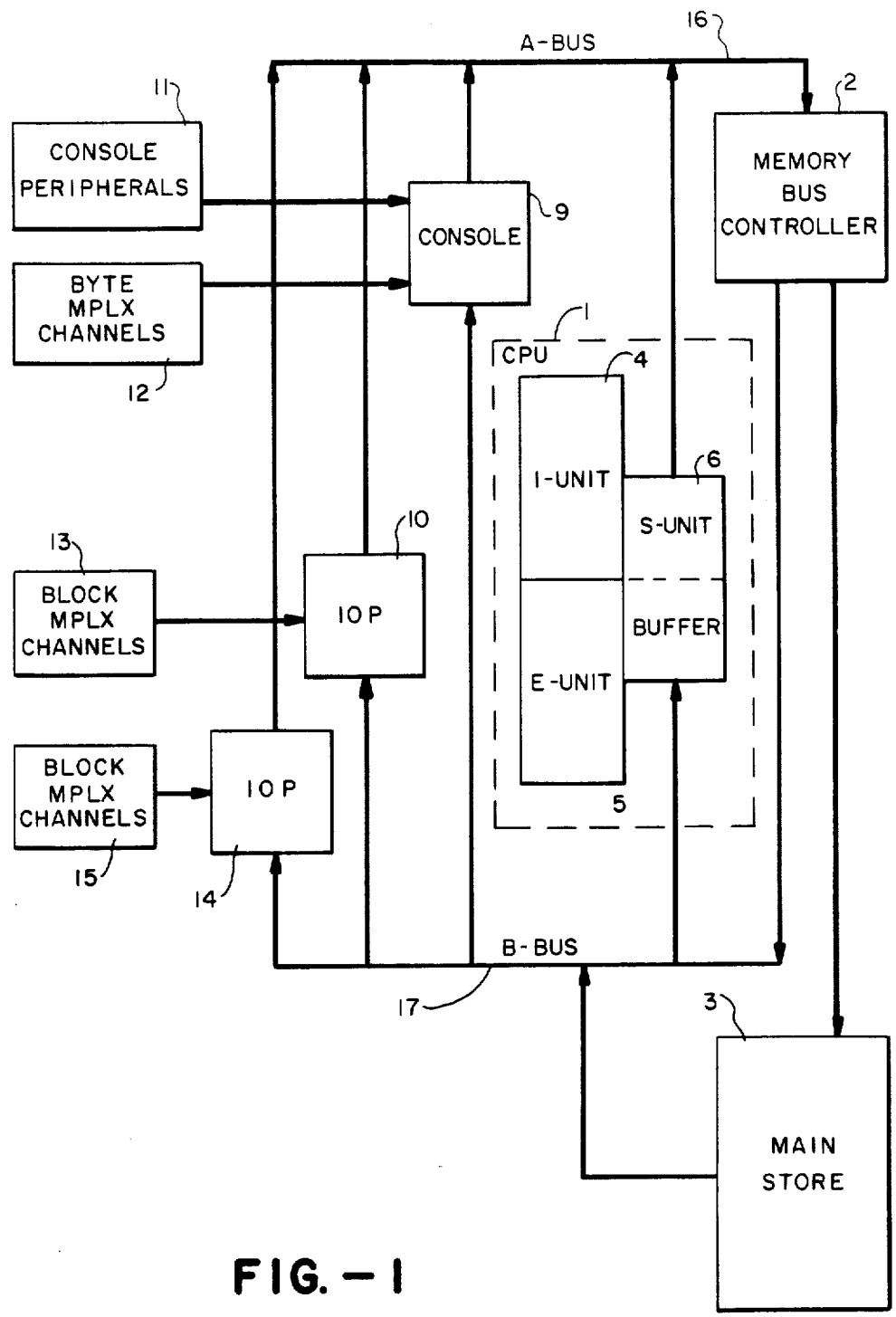
FIG. 1 depicts a block diagram of a data processing system having a virtual-addressed and real-addressed memory apparatus.

Overall System—FIG. 1

FIG. 1 shows a block diagram of a data processing system. Further details of the system are described in the above cross-referenced applications. The system includes a central processing unit (CPU), a memory bus controller (MBC), and a main storage unit (MSU). The central processing unit 1 includes the I-unit 4, the E-unit 5, and the S-unit 6. The instruction unit (I-unit) 4 fetches, decodes, and controls instructions and controls the central processing unit. The execution unit (E-unit) 5 provides computational facilities for the data processing system. The storage unit (S-unit) 6 controls the data processing machines instruction and operand storage and retrieval facilities.

Other major parts of the FIG. 1 system includes one or two input-output processors (IOP) 10,14 which receives and processes input-output requests from the central processing unit 1 and provides block multiplexer channels; the console 9 which communicates with the central processing unit 1 to provide system control and byte multiplexer channels; the memory bus controller (MBC) 2 which provides main memory and bus control, system wide coordination of functions and timing facilities; and the main storage unit (MSU) 3 which provides the system with large capacity memory.

The data processing system shown in FIG. 1 employs a dual bus structure including the A bus 16 and the B bus 17. The A bus carries data from the console, the input-output processor 10, and the central processing unit 1 to the memory bus controller 2. The B bus carries data from the memory bus controller 2 and the main storage unit 3 to the console 9, the input-output processor 10 and the central processing unit 1.

In FIG. 1, The Cache Storage Unit (S-Unit) 6 provides high speed cache (buffer) storage for instructions and operands. The S-Unit 6 receives and processes all requests for data (either instructions or operands) by the I-Unit 4. Virtual-to-system address translations are accomplished by the S-Unit, which also maintains the Translation Lookaside Buffer (TLB). Cache to mainstore data transfers necessary to honor I-Unit requests for data are initiated by the S-Unit.

The S-Unit 6 also provides the Bus interface between the I-Unit 4 and the E-Unit 5 portions of the CPU and the rest of the system.

Figure 2:
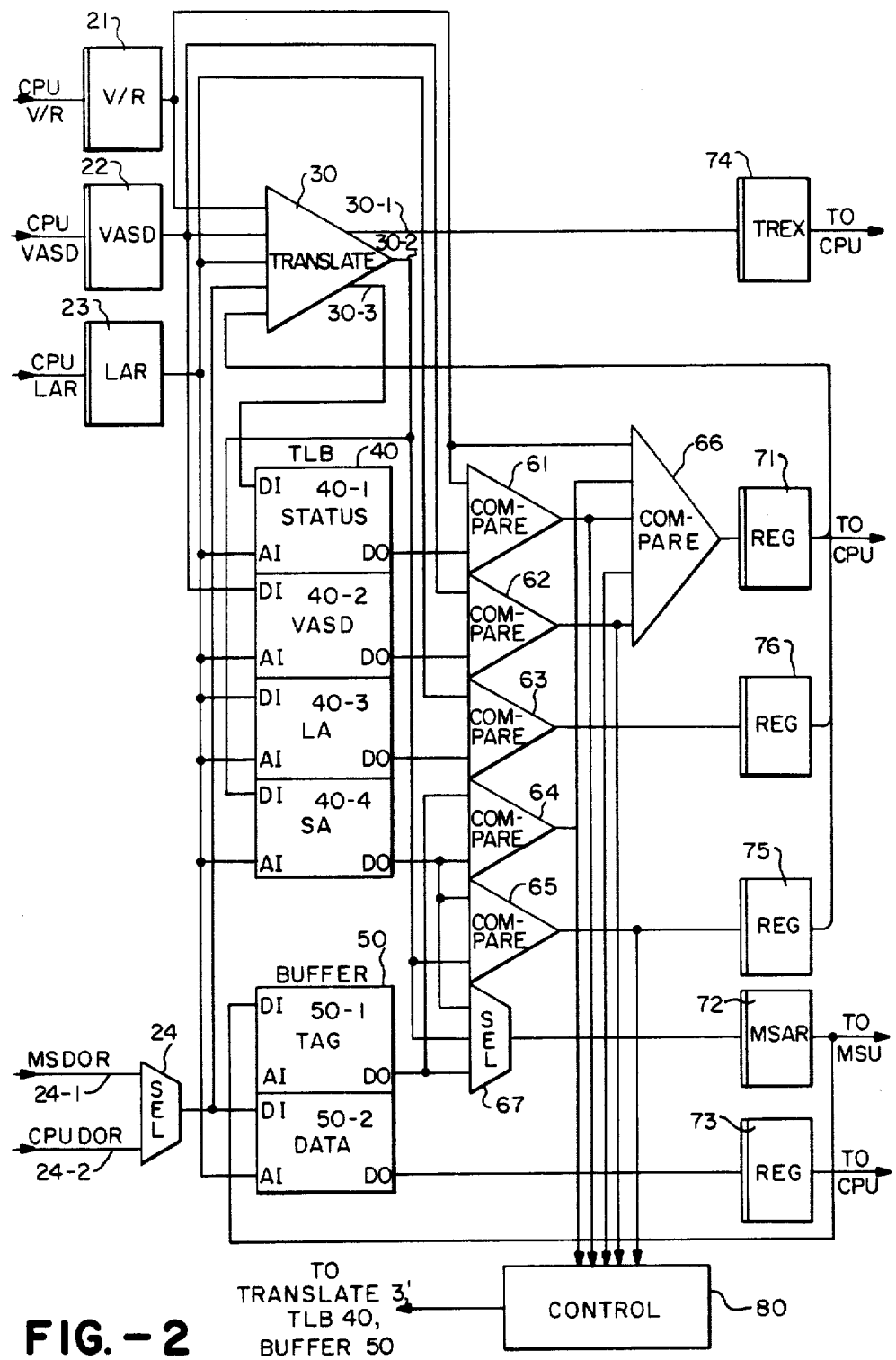
FIG. 2 depicts a block diagram of the addressing mechanisms which forms parts of the memory apparatus in FIG. 1 system.

S-Unit Detail—FIG. 2

FIG. 2 shows a detailed block diagram of the S-unit of FIG. 1. The functional characteristics of each block in FIG. 2 are described as follows.

CPU Request Latches. Data requested by the CPU is identified by three fields which are latched and saved by the S-unit in the CPU request latches 21, 22, and 23.

The Virtual/Real (V/R) bit in a request field, saved in latch 21, signifies whether the requesting logical address is virtual or real.

The Virtual Address Space Descriptor (VASD), saved in latch 22, identifies the address space to be used to fetch data for a virtual address request. For a real address request, the VASD field is not significant.

The Logical Address (LA) field, saved in latch 23, identifies the logical address of the requested data. A logical address can be either a Virtual Address (VA) or a Real Address (RA). For a virtual address access, the LA field is a virtual address. For a real address access, the LA field is a real address.

Translation Lookaside Buffer. The Translation Lookaside Buffer (TLB), block 40, is a storage array of 256 entries which contains information to perform fast logical address to system address translations. The TLB is addressed by the logical address bits 12–19 contained in the LAR register 23. Each TLB entry consists of the four fields described below.

The Status field, block 40-1 consists of a Virtual Address Valid subfield and a Real Address Valid subfield. The Virtual Address Valid Subfield indicates whether the entry may be used to perform a Virtual-to-System address translation. The Real Address Valid subfield indicates whether the entry may be used to perform a Real-to-System address translation. The TLB status field is sourced from the translator 30.

The TLB VASD field, block 40-2, saves the VASD used to make the TLB entry. It is only significant when used to translate a virtual address to a real address. The TLB VASD field is sourced from the VASD latch 22.

The TLB LA field, block 40-3, saves the Logical page address, bits 1–9 of the LAR 23, used to make the TLB entry.

The TLB SA field, block 40-4, saves the system page address, bits 1–19 of the translator address bus 30-2, which corresponds to the logical address saved in the LA field, block 40-3, when the TLB entry is made.

Buffer. The buffer, block 50, is a storage array of 128 entries which provides fast data access. The buffer is addressed by logical address bits 20–26 from the LAR 23. Each buffer entry consists of a tag field and a data field.

Each buffer data field in block 50-2, consists of storage for 32 bytes of mainstore data. The data field is sourced from a multiplexor 24 which selects either data from mainstore resulting from a mainstore read access, or data from the CPU resulting from a CPU store instruction.

The buffer tag field in block 50-1, consists of a control subfield and an address subfield.

The tag address subfield contains the system address of the data in the corresponding buffer data field. The tag address subfield is written when data from mainstore is written into the buffer. The tag address subfield is sourced from the Mainstore Address Register (MSAR) 72 which contains the system address used to access the data.

The tag control subfield indicates the state of the corresponding buffer data field. The following states are distinguished:
empty: The data field does not contain valid data
Unmodified: The data field contains unmodified data
modified: The data field contains modified data.

The tag control subfield is initially set to the empty state. It is also set to the empty state whenever a data block is deleted from the buffer. The tag control subfield is set to the unmodified state when data from mainstore is written into the buffer. The tag control subfield is set to the modified state when the data is stored into by the CPU. A modified buffer entry must be stored to mainstore before the buffer entry can be reused by another mainstore data block.

Translator. The translator, block 30, contains the hardware necessary to transform CPU data access parameters in latches 21, 22, and 23 to system addresses required to access the data in mainstore via the MSAR, latch 72. The translator is invoked whenever the TLB does not contain a valid translation for a CPU data access. The translator performs the virtual-to-system or real-to-system address transformation and places the results in the TLB. The details of the translator and of the virtual-to-system or real-to-system address transformation employ well-known algorithms and apparatus. The translator requires that the CPU access parameters be partionable into two classes, one class required for both virtual and real transformations (LAR-latch 23) and the other class only for virtual transformations (VASD-latch 22).

The translator, block 30, receives as inputs the CPU data access parameters in latches 21, 22, and 23, the status of the current TLB entry from the TLB status latches 71, 75, and 76, and mainstore resident translation table data via multiplexor 24.

The translator, block 30, produces three outputs described below. Translation exception status bus 30-1 identifies the cause of a translation failure if the translator is not able to successfully complete a translation. Translation address bus 30-2 provides the system address to access mainstore resident translation tables during a translation. Following a successful translation, the address bus contains the translated system address. Translation status bus 30-3 provides the TLB status to be written at the conclusion of a successful translation.

Match. The match 61-66 compares the CPU data access parameters with the information stored in the TLB and TAG arrays to determine whether the requested translation is TLB resident and the requested data is buffer resident.

The TLB status match function comparator 61 compares the request type (virtual or real) held in the V/R latch 21 with the contents of the accessed TLB status resident field in block 40-1, as summarized in TABLE A-1. If the V/R latch 21 indicates real, and the Real Address Valid subfield from the TLB status field 40-1 indicates valid, then the TLB status match function 61 indicates a TLB status match. Similarly, the TLB status match function comparator 61 also indicates a TLB status match if the V/R latch 21 indicates virtual, and the Virtual Address Valid subfield from the TLB status field 40-1 indicates valid.

The TLB VASD match comparator 62 indicates a match if the CPU VASD field held in the VASD latch 22 matches the VASD field from the TLB VASD block 40-2.

The TLB LA match comparator 63 indicates a match if the CPU logical address (LA) bits 1-19 held in the LAR latch 23 matches the corresponding logical address bits from the TLB LA block 40-3.

The system address match comparator 64 indicates a match if the contents of the accessed TLB SA field 40-4 matches the corresponding bit positions contents of the tag address subfield of the accessed buffer tag 50-1 and if the tag control subfield is not in the empty state.

The TR/TLB address match comparator 65 indicates a match if the contents of the accessed TLB SA field 40-4 matches the address on the translation address bus 30-2.

The match comparator 66 produces three match results which are latched in the status latch 71.

TLB match status indicates that the requesting address has a valid TLB-resident translation. TLB match status is indicated for a real address access if the match functions 61 and 63 both indicate match. They both indicate match if the accessed TLB entry is valid for real address translations and the requesting real address matches the contents of the TLB LA field 40-3. TLB match status is indicated for a virtual address access if the match functions 61, 62 and 63 all indicate match. They all indicate match if the accessed TLB entry is valid for virtual address translations, the CPU VASD in latch 22 matches the contents of the TLB VASD field from block 40-2, and the requesting virtual address matches the contents of the TLB LA field from block 40-3.

Tag match status indicates that the requested data is buffer-resident. Tag match status is indicated if the requirements for TLB match status are met and if the system address match function comparator 64 indicates a match.

Result Latches. The translation exception status latch 74 saves the translation exception status resulting from the translator 30.

The match status latch 71 saves the match status from the final match comparator 66.

The TR/TLB match status latch 75 saves the results of the TR/TLB Address match function comparator 65.

The mainstore address register (MSAR) latch 72 holds the system address required for a mainstore data access. Latch 72 is sourced from one of three sources via the MSAR multiplexor 67. The translator 30 specifies mainstore data addresses via the translation address bus 30-2. A CPU data access specifies a mainstore data address via the TLB SA field from block 40-4. The mainstore address required to store a modified buffer data block back to mainstore is sourced from the Buffer Tag field block 50-1.

The Buffer Data Out Register (BDOR) latch 73 holds data accessed from the Buffer data field 50-2, for presentation to the CPU and to mainstore.

DETAILED OPERATION

The present invention is primarily concerned with the TLB block 40. The present invention allows a real-to-system address translation and a virtual-to-system address translation to occupy the same entry of the TLB 40 provided that both the logical address field and the system address field are identical for each translation. The detailed operation of the present invention will be described assuming for purposes of description an initially empty TLB 40 and an initially empty buffer 50. First, a real address CPU requesting access is described which requires a real-to-system address translation to be placed into the TLB 40. Second, a virtual address CPU requesting access is described which requires a virtual-to-system address translation to be placed into the same entry of the TLB 40.

The CPU requests a real address access by setting the virtual/real bit 21 to real and by setting the requested real address in the LAR register 23. The address in the LAR register 23 is used to access an entry in the TLB 40 and in the buffer 50. The accessed TLB status subfield 40-1 and the logical address subfield 40-3 are compared in the status match comparator 61 and the logical address match comparator 63, respectively. The final match comparator 66 resolves the TLB match and places the results in the TLB status register 71 according to TABLE A below. Since the TLB is initially empty, the real address valid bit of the status subfield 40-1 will indicate that the TLB entry is invalid for real-to-system address translations.

According to TABLE A, the status in match status latch 71 will indicate no TLB match and that a real address translation is required.

TABLE A-1

| TLB Status Match Function - 61 | | | |
|---|---|---|---|
| TLB STATUS | | MATCH RESULTS | |
| R Valid | V Valid | Real Access | Virtual Access |
| 0 | 0 | 0 | 0 |
| 0 | 1 | 0 | 1 |
| 1 | 0 | 1 | 0 |
| 1 | 1 | 1 | 1 |

TABLE A-2

| TLB Final Match Function 66 | | | | |
|---|---|---|---|---|
| Status | VASD | LA | Access Type | |
| Match 61 | Match 62 | Match 63 | Real | Virtual |
| 0 | 0 | 0 | 0 | 0 |
| 0 | 0 | 1 | 0 | 0 |
| 0 | 1 | 0 | 0 | 0 |
| 0 | 1 | 1 | 0 | 0 |
| 1 | 0 | 0 | 0 | 0 |
| 1 | 0 | 1 | 1 | 0 |
| 1 | 1 | 0 | 0 | 0 |
| 1 | 1 | 1 | 1 | 1 |

1 = Match
0 = Mismatch

The translator 30 initiates a real address to system address translation upon recognizing the no-match status in the TLB status latch 71. The translator 30 translates the real address held in the LAR 23 and places the resulting system address on line 30-2. Line 30-3 is set to indicate real address valid and virtual address not valid. When the translation is complete, the results of the translation are written into the TLB 40. The status field 40-1 is set to indicate real address valid and virtual address not valid. The VASD field 40-2 is not written. The LA field 40-3 is written to the real address value contained in the LAR 23. The SA field 40-4 is written to the translated system address value for the translator 30 on line 30-2.

The TLB entry thus written will match the requesting address contained in the virtual/real latch 21 and in the LAR register 23. The TLB status latch 71 will indicate TLB match.

The accessed buffer tag field 50-1 is compared to the TLB SA field 40-4 in comparator 64. Since the buffer is initially empty, the tag control subfield will indicate that the accessed entry is in the empty state. The tag mismatch status is latched in the TLB status latch 71. The tag mismatch status in latch 71 initiates a mainstore access for the data identified by the system address in the MSAR latch 72. The address in the MSAR 72 is selected from the TLB SA field 40-4 through multiplexer 67. When the data returns from mainstore over the MSDOR, line 24-1, it is selected through multiplexor 24 and is written into the buffer data field 50-2. After the data is written into the buffer data field 50-2, the buffer tag field 50-1 is written with the system address contained in the MSAR latch 72 and the tag control subfield is set to the unmodified state.

At this point, the TLB entry matches the requesting access parameters as indicated by comparators 61 and 63 and summarized in the TLB status latch 71, and the requested data is resident in the buffer as indicated by the comparator 64 and summarized in the TLB status latch 71. The accessed buffer data 50-2 is latched into the BDOR latch 73 for presentation to the CPU and the request is complete.

The CPU requests a virtual address access by setting the virtual/real bit 21 to virtual, loading the VASD latch 22 with the virtual address space descriptor, and loading the virtual address into the LAR 23. Again, the address in the LAR 23 accesses an entry in the TLB 40 and an entry in the buffer 50. Assuming that the address in the LAR 23 accesses the real-to-virtual translation entry made previously, the comparator 61 will indicate no TLB match in the TLB status latch 71 because the virtual address valid bit indicates the entry is not valid for virtual-to-system address translations. The TLB mismatch status in the TLB status latch 71 initiates a translation in the translator 30. The translator initiates a virtual-to-system address translation as indicated by the virtual/real bit 21. The translator uses the virtual address space descriptor in the VASD latch 22 and the virtual address in the LAR latch 23 to perform the translation. The details of the translation are unimportant and may for example, employ the well-known IBM translation algorithm which uses mainstore-resident translation tables to derive a system address. The translator accesses the mainstore-resident translation tables by selecting the address of the desired translation table entry to line 30-2, through the multiplexer 67, and into the MSAR register 72. The translation table entry information from the mainstore is selected to the translator from the MSDOR line 24-1 through the multiplexer 24.

If the translation cannot successfully complete, the translation exception status is placed in the translation exception latches 74 and the request is complete. If the translation does complete successfully, the resulting system address is placed on line 30-2 where it is compared with the system address stored in the accessed TLB system address field 40-4 by comparator 65. The results of the system address comparison are saved in the TR/TLB match status latch 75. At the same time, the virtual address held in the LAR 23 is compared to the accessed TLB logical address field 40-3 in comparator 63 and the results are saved in the TLB LA match latch 76. If either the TR/TLB match status latch 75 or the TLB LA match latch 76 indicates a mismatch, then the real address valid status bit in the status field 40-1 is set to 0, indicating that the TLB entry is invalid for subsequent real-to-system address translations. If, however, both the TR/TLB match status latch 75 and the TLB LA match latch 76 indicate match, then the real address valid bit of the TLB status field 40-1 is not updated. In the present example, since the real address valid bit had been previously set to indicate valid, then following the virtual-to-system address translation it would still indicate that the TLB entry is valid to perform real-to-system address translations.

Independent of the state of latches 75 and 76, the virtual address translation completes by setting the virtual address valid bit of the TLB status field 40-1 to valid, writing the VASD field 40-2 to the contents of the VASD latch 22, writing the SA field 40-3 to the contents of the LAR latch 23 and writing the SA field 40-4 to the system address provided by the translator 30 on the line 30-2.

The TLB 40 now contains a virtual address to system address translation for the address requested by the CPU contained in latches 21, 22, and 23. The buffer tag 50-1 is next examined to determine if the requested data is buffer-resident. If the comparator 64 indicates that the data is not buffer-resident, the data is fetched from mainstore as described above. If the data is buffer-resident as indicated by a match in comparator 64, then the data is latched in the BDOR latch 73 as described above and the request completes.

Thus it is possible for one TLB entry to be used both for real-to-system address translations and for virtual-to-system address translations as long as the virtual address equals the real address and they both translate to the same system address. The required action for making a TLB entry is summarized in TABLE B.

TABLE B

| | | STATUS | | |
|---|---|---|---|---|
| Access Type | Match[1] | V valid VAV | R valid RAV | VASD Written |
| Virtual | 0 | 1 | 0 | 1 |
| Virtual | 1 | 1 | * | 1 |
| Real | 0 | 0 | 1 | * |
| Real | 1 | * | 1 | * |

V = virtual address access
R = real address access
[1]Match = (comparator 63 match) and (comparator 65 match) = (requesting LA = TLB LA) and (requesting SA = TLB SA
* = do not update the field.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In a data processing system generating requesting logical addresses that identify data, the requesting logical addresses being members of a set of logical addresses including a first subset comprising virtual addresses and a second subset comprising real addresses, and generating a requesting field indicating whether the requesting logical address is a virtual address or a real address, a memory apparatus comprising, a main store for storing the data at system addresses, a buffer store, in communication with the main store, for storing a subset of the data from the main store, address means, in communication with the buffer store and with the system to receive the requesting logical address and the requesting field, for addressing said buffer store with requesting logical addresses, said address means including means for storing the requesting field, an address translator, in communication with the addressing means, for translating logical addresses to provide a translated system address, a translation buffer, in communication with the address means and address translator, storing translation information for associating logical addresses with system addresses, said translation buffer including means for storing a resident field for indicating if stored translation information associates a virtual address with a system address or a real address with a system address, comparator means, in communication with the addressing means and the translation buffer, for comparing the requesting field of the requesting logical address and the resident field to determine if the translation buffer stores translation information for the requesting logical address, means, in communication with the translation buffer and the address translator, for setting the resident field to indicate when translation information stored in the translation buffer associates a virtual address with a system address, a real address with a system address, or both a virtual address and a real address with a system address.

2. The apparatus of claim 1 wherein said address translator includes means for accessing address transform tables, each of said tables for transforming virtual addresses to system addresses, wherein said address means includes register means providing a virtual address space descriptor for identifying one of said transform tables.

3. The apparatus of claim 2 wherein the translation buffer includes means for storing a resident virtual address space descriptor for identifying the virtual address space associated with transform information stored in said translation buffer and wherein said comparator means includes means for comparing the requesting virtual address space descriptor with the resident virtual address space descriptor for providing a space match signal to indicate when the translation buffer stores translation information for the addesss space of the requesting logical address.

4. The apparatus of claim 1 wherein said logical addresses include page fields and wherein said translation buffer stores translation information for page field portions of logical addresses.

5. The apparatus of claim 1 wherein said logical addresses and system addresses include page fields and wherein said translation buffer includes means for storing a page field portion of a logical address and of a system address and wherein said comparator means includes means for comparing the requesting page portion of a logic address with the resident logical address to provide a logical match signal when the requesting and resident page portions of logical addresses are the same and includes means for comparing the translated page portion of a system address with the resident page portion of a system address to provide a system match signal for indicating when the translated and resident system address page portions are the same.

6. The apparatus of claim 5 wherein said requesting field includes a virtual address valid field and a real address valid field and wherein said translation buffer includes means for storing a resident virtual address valid field and a resident real address valid field for indicating when the stored translation information is valid for virtual address fields and real address fields, respectively, and wherein said comparator means includes means for comparing said requesting virtual address valid field with said resident virtual address valid field to provide a virtual match signal for indicating when the stored translation information is valid for a requesting virtual address and means for comparing the requesting real address valid field with the resident real address valid field to provide a real match signal for indicating when the stored translation information is valid for a requesting real address.

7. The apparatus of claim 5 wherein said means for setting the resident field includes control means, said control means including,
   means responsive to a requesting virtual address and the absence of either said logical match signal of said system match signal to set said virtual address valid field valid and to set said real address valid field invalid,
   means responsive to a requesting virtual address, when said logical match signal and said system match signal are present, to set the virtual address valid field valid,
   means responsive to a requesting real address, when the logical match signal or the system match signal is not present, to set said virtual address valid field invalid and sets said real address valid field valid,
   and means responsive to a requesting real address, when said logical match signal and said system match signal are present, to set said real address valid field valid.

8. The apparatus of claim 1 wherein said requesting field includes a virtual address space descriptor field and wherein said translation buffer includes a field for storing a resident virtual address space descriptor field, said comparator means including means for comparing the requesting and resident virtual address space descriptor fields to form a space descriptor match signal when said space descriptor fields are the same, said space descriptor match signal used to determine if the translation buffer stores translation information for the requesting logical address.

9. The apparatus of claim 7 wherein said requesting field includes a virtual address space descriptor field and wherein said translation buffer includes a field for storing a resident virtual address space descriptor field, said comparator means including means for comparing the requesting and resident virtual address space descriptor fields to form a space descriptor match signal when said space descriptor fields are the same, said space descriptor match signal used to determine if the translation buffer stores translation information for the requesting logical address, said control means operative to store a new virtual address space descriptor in said resident virtual address space descriptor field whenever said virtual address valid field is set valid.

* * * * *

UNITED STATES PATENT AND TRADEMARK OFFICE
CERTIFICATE OF CORRECTION

PATENT NO. : 4,654,790

DATED : March 31, 1987

INVENTOR(S) : Gary A. Woffinden

It is certified that error appears in the above-identified patent and that said Letters Patent is hereby corrected as shown below:

Column 2, line 40: "of the background" should be "of the above background"

Column 11, line 24: "signal of said" should be "signal or said"

Signed and Sealed this

Thirteenth Day of December, 1988

Attest:

DONALD J. QUIGG

*Attesting Officer*     *Commissioner of Patents and Trademarks*